United States Patent
Ho et al.

(10) Patent No.: US 6,195,682 B1
(45) Date of Patent: Feb. 27, 2001

(54) CONCURRENT SERVER AND METHOD OF OPERATION HAVING CLIENT-SERVER AFFINITY USING EXCHANGED CLIENT AND SERVER KEYS

(75) Inventors: Randall S. Ho, Germantown, MD (US); Richard D. Latham, Ft. Worth, TX (US); Srikanth S. Meenakshi, Germantown, MD (US)

(73) Assignee: International Business Machines Corporation, Armonk, NY (US)

( * ) Notice: Under 35 U.S.C. 154(b), the term of this patent shall be extended for 0 days.

(21) Appl. No.: 09/179,466

(22) Filed: Oct. 27, 1998

(51) Int. Cl.⁷ .......................... G06F 15/16; G06F 15/167
(52) U.S. Cl. ........................ 709/203; 709/217; 709/218; 709/311; 709/316; 705/75
(58) Field of Search ....................................... 709/203, 100, 709/104, 201, 202, 217, 311, 314, 316, 330, 332, 219, 225, 227, 228, 229, 238, 232; 705/75, 235; 711/164

(56) References Cited

U.S. PATENT DOCUMENTS

| | | | |
|---|---|---|---|
| 5,341,477 | 8/1994 | Pitkin et al. | 709/226 |
| 5,388,214 | 2/1995 | Leiserson et al. | 712/15 |
| 5,544,316 | 8/1996 | Carpenter et al. | 709/310 |
| 5,560,008 | 9/1996 | Johnson et al. | 713/201 |
| 5,617,570 | 4/1997 | Russell et al. | 709/312 |
| 5,638,374 | * 6/1997 | Heath | 370/322 |
| 5,761,507 | 6/1998 | Govett | 709/101 |
| 5,812,768 | * 9/1998 | Pageet et al. | 709/228 |
| 5,892,905 | * 4/1999 | Brandt et al. | 713/201 |
| 5,968,176 | * 10/1999 | Nessett et al. | 713/201 |
| 6,006,266 | * 12/1999 | Murphy, Jr. et al. | 709/227 |

OTHER PUBLICATIONS

"Power Programming with RPC" by John Bloomer, published by O'Reilly & Associates, Inc., Sebastopol, CA 95472, ISBN 0–937175–77–3, Nov. 1993, p. 152–160.

* cited by examiner

Primary Examiner—Zarni Maung
Assistant Examiner—Beatriz Prieto
(74) Attorney, Agent, or Firm—Morgan & Finnegan, L.L.P.; Joseph C. Redmond, Jr.

(57) ABSTRACT

In a distributed information network, a broker server is coupled to a plurality of child servers and to a plurality of clients in the network. The broker server connects clients to a child server in a queue on a FIFO basis and provides the client with a key identifying the child server. The client provides the server with a copy of its key at the time of the initial service request. Both the child server and the client retain a copy of the other's key upon disconnect. The child server returns to the bottom of the queue after disconnect. On a subsequent client service request, the client includes the child server key in the service request and the broker automatically re-connects the client to the child server wherever S1 may be in the queue, provided the child server is not busy serving other clients. When reconnected, the client send its key to the child server which compares the key to the retained copy of the client key. If the keys match, the child server does not refresh and reload the client state data which improves server performance. If the child server is not available, the broker assigns the client to the child server at the top of the queue. The client may also be an intermediate server for other or first tier clients, in which case the intermediate server forwards the server keys to the first tier clients for service requests to the child server.

27 Claims, 4 Drawing Sheets

CONCURRENT SERVER AND METHOD OF OPERATION HAVING CLIENT-SERVER AFFINITY USING EXCHANGED CLIENT AND SERVER KEYS

BACKGROUND OF THE INVENTION

1. Field of the Invention

This invention relates to distributed information systems. More particularly, the invention relates to concurrent servers and methods of operation having client-server affinity.

2. Description of Prior Art

A concurrent server is a gateway in a distributed information system, e.g., local area network, the internet, and consists of a parent process and a number of child processes. Parent/child processes are well known terms describing a relationship between processes in a multitasking environment in which the parent process calls a child process spawned by the parent and suspends its own operation until the child process aborts or is completed. Parent/child processing is further described in the text "Power Programming With RPC" by J. Bloomer, published by O'Reilly & Associates, Inc. Sebastopol, Calif., 1992 at pages 152–160. Typically, the parent process waits on a well-known port for client requests and forwards these requests to child processes. The child processes actually provide the services to the client. Traditional client-server applications involve a "pool controller" process which dispatches client requests to server processes which are assigned to service the request. One problem with "pool controllers" is service may become unacceptable when a delayed response occurs due to the rate of client requests exceeding the rate at which the controller can process client requests. Similarly, in the case of client-server applications involving "state-less" concurrent servers, the server processes are forced to maintain client-specific application state-data in a shared memory/persistent memory area and refresh them for every service request from a particular client. The requirement of refreshing the state data results in a performance penalty for concurrent servers.

What is needed to avoid the performance penalty from delayed response time or refresh time is a concurrent server and method of operation which provides client-server process affinity whereby a client is automatically reconnected to the server last servicing the client's previous service request.

Prior art related to concurrent servers includes the following:

U.S. Pat No. 5,388,214 issued Feb. 7, 1995, discloses a parallel computer system including a request distribution network for distributing process requests to selected sets of processors in parallel. The network includes a plurality of request distribution nodes. Each node is connected to receiving process requests from and to couple process data to a parent, each request distribution node is further connected to couple processing requests to and receive process data from selected children. Each request distribution node in response to request address information receives from its parent, identifies a selected one of its children, and thereafter couples further request address information which it receives and processing requests in parallel to its children.

U.S. Pat. No. 5,544,316 discloses a system and method for optionally registering a local process to allow participation in a single system semantic. A mechanism is provided to allow processes to register as part of a distributed context. Registration may be accomplished explicitly by any child process to name its parent in the hierarchy, or automatically by the parent process when spawning children. This mechanism allows the destination nodes in the distributed environment may be selected at run time without requiring knowledge on the part of the executing process. This allows the ability to cause processes to be distributed based on machine type, facilities available, or load-balancing considerations.

U.S. Pat. No. 5,341,477 issued Aug. 23, 1994, discloses a broker mechanism which allocates a plurality of servers, each server having available resource capacity to a plurality of clients delivering one of several services to the clients. The broker operates by monitoring a subset of all available servers capable of delivering the requested service. The broker receives client requests for the services and based on a network policy and available resource capacity, suggests one of the servers, monitors it for the particular service to one of the clients making a request. The selected server enforces its local policy of not allowing any connections exceeding its available resource capacity.

U.S. Pat. No. 5,560,008 issued Sep. 24, 1996, discloses a remote authentication and authorization process in a distributed data processing system. A set of credentials for the process are created at a server in response to a message from a client requesting a service. The server returns a credentials ID identifying the created set of credentials to the client process. The client uses this returned ID in subsequent requests and is authorized request as controlled by the set of credentials identified by the returned ID in a subsequent request. The server can deny access to the service by the process if the ID returned in a subsequent request is determined by the server not to identify the set of credentials. The server denies the access if the server requires an authentication for the process.

U.S. Pat. No. 5,761,507 discloses concurrent servers within a server with a transaction manager which intercepts all requests for service from any of a plurality of clients; establishes connections independently of task requests and assigns available requests in the order the requests are received to provide equitable distribution of service resources over an increased number of client/server connections. The transaction manger places all tasks in a queue and starting and stopping additional serves based on queue length.

U.S. Pat. No. 5,617,570 discloses a server which includes a dispatcher, a plurality of worker tasks, and a plurality of dispatcher shared memory areas wherein each dispatcher shared memory area corresponds to a worker task. The dispatcher is responsive to an operation call from a call mechanism for selecting a worker task to execute the operation call, receiving the operation call directly into the dispatcher shared memory space of the worker task and indicating to the dispatcher to the worker task that the operation call has been assigned to the worker task. After completion of the worker task the dispatcher provides the results of the of the operation request directly from the dispatcher shared memory space of the worker task to the connection mechanism.

None of the prior art discloses a system and method for handling multiple client service requests using a broker to allocate service requests to different servers whereby a client is reconnected to the same server last serving the client, the client having the server key that last served it and the server having a matching client key that it last used in serving the client thereby eliminating any system performance penalty from delayed response time or refresh time in processing client requests.

SUMMARY OF THE INVENTION

An object of the invention is a concurrent server system and method of operation that provides client-server affinity upon reconnection of the client to the server which previously served the client.

Another object is a concurrent server system and method of operation for handling multiple client service requests without the need to store and refresh client-specific application data.

Another object is a concurrent server system and method of operation for keying a client to the last server previously serving the client upon reconnection.

Another object is a concurrent server system and method of operation for allocating client service requests among a plurality of concurrent servers.

These and other objects, features and advantages are achieved in a concurrent server system including a plurality of current servers coupled to a plurality of clients through a broker that assigns the servers to a queue operating on a First-In/First-Out (FIFO) basis. Upon a client (C1) service request, the broker assigns the request to the server (S1) at the top of the queue and generates a server key (S1) which is passed to the client which uniquely identifies the server to which the client is assigned. Upon connection the server (S1) and the client (C1) exchange keys. When the service request is completed, the client retains the server key (S1) and the server retains the client key (C1). The server is assigned to the bottom of the queue by the broker and advances in the queue as service requests are assigned by the broker. When the server reaches the top of the queue, it is assigned to another client unless at any time while in the queue, the client (C1) should submit a service request including server key (S1) indicating a preference for the server. The broker searches the queue and if the server is available, the broker forwards the connection request to the server and the client sends the client key (C1) to the server. The server compares the received client key which the retained copy and if it finds a match, does not need to reload and refresh client-specific application state data. Thus, the concurrent server system provides client-server affinity upon reconnection which eliminates the need to store and refresh client-specific application data by using server and client keys which are exchanged to preferentially select the server from a plurality of servers managed and allocated by a broker.

DESCRIPTION OF DRAWING

The invention will be further understood from the following detailed description of a preferred embodiment taken in conjunction with an appended drawing, in which.

DESCRIPTION OF PREFERRED EMBODIMENT

Figure 1:
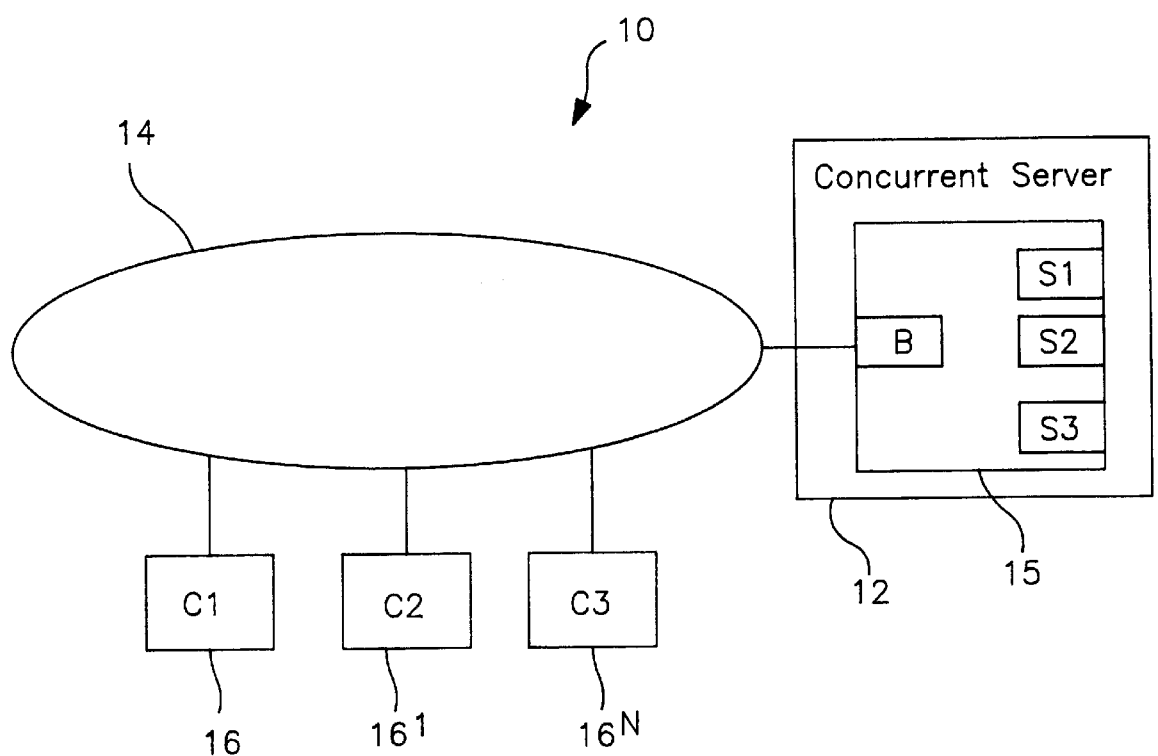
FIG. 1 is a representation of a concurrent server system and broker serving a plurality of clients in accordance with the principles of the present invention.

FIG. 1 discloses a concurrent server network 10 including a concurrent server 12 coupled to a network 14, e.g., token ring or distributed information system, and to client stations $16^1 \ldots 16^N$, e.g., PCs, workstations, etc. The concurrent server 12 is a gateway for providing its services to the clients $16^1 \ldots 16^N$. The server consists of a parent or broker process B and a number of child processes represented by servers S1, S2 and S3. The broker is configured to permit only up to N concurrently served clients, where N is a configurable positive integer. The broker is further configured to guarantee at least M available child servers, where M is a configurable positive integer, except when the number of concurrently served child servers is greater than N−M. The child servers are configured to terminate connection to a client after being successively connected to the same client R times, where R is a configurable positive integer. More specific details of concurrent servers employed in the present invention are described in U.S. Pat. No. 5,761,507 assigned to the same assignee as that of the present invention and which is fully incorporated herein by reference.

The service processes S1, S2 and S3, are "state-less" servers. That is the server processes are forced to maintain client-specific application state data in a shared-memory/persistent memory area and refresh them for every service request from a particular client. "State-less" servers are described in the text "Encyclopedia of Computer Science", Third Edition by A. Ralston et al, published by Van Nostrand Reinhold, NY, N.Y. 1993 at page 555. As indicated previously a performance penalty is paid by the server for every transaction involving a "state-less" server.

The present invention overcomes the problem using "server affinity" as will now be described in FIG. 2, taken in conjunction with FIGS. 3–7. Briefly, the invention seeks to pass a key between a client and child server and keep the client state data exclusively on the server side which enables the client to maintain more state data without impacting performance. The key may be stored in the client-browser memory for easy recall.

Figure 2:
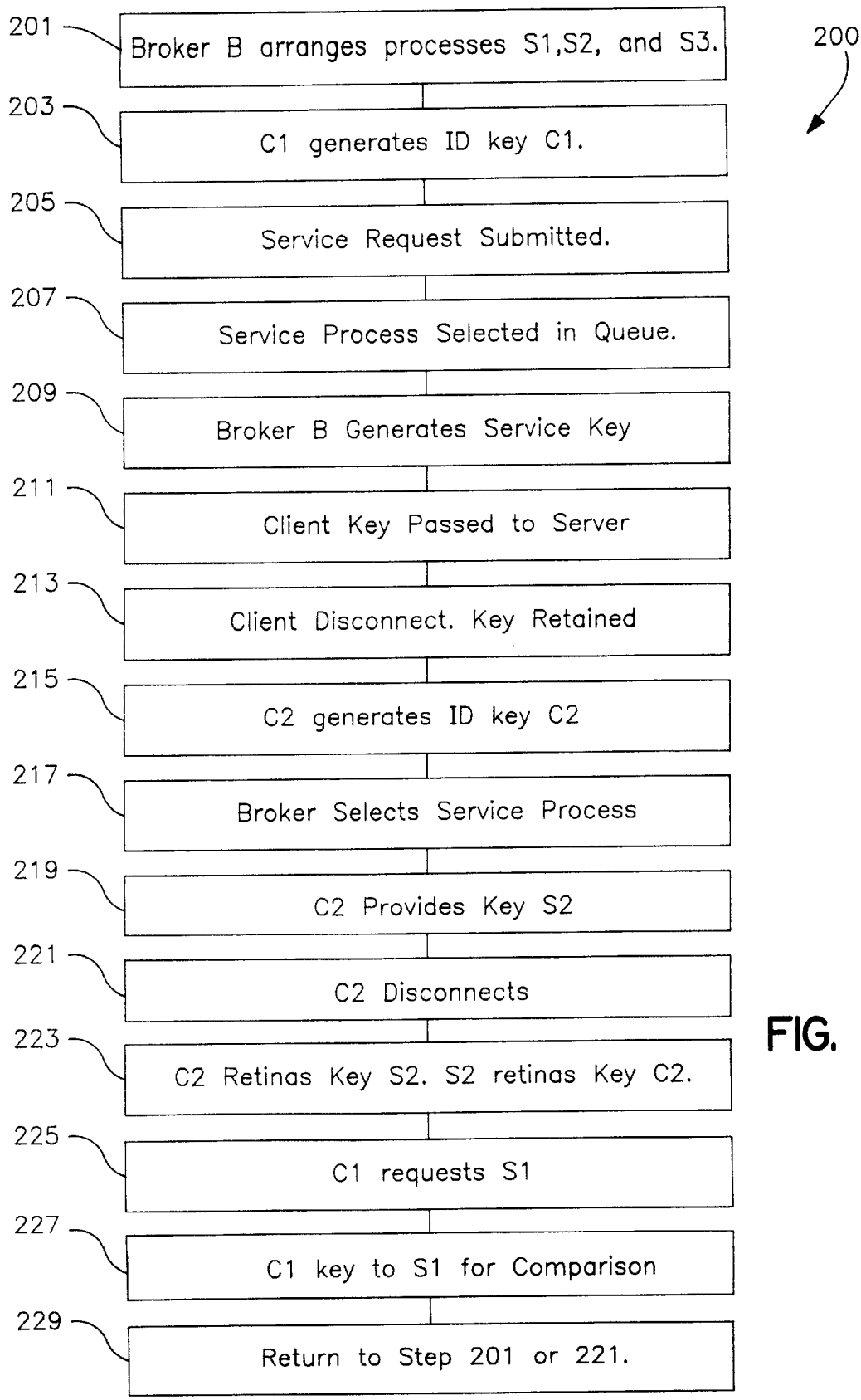
FIG. 2 is a flow diagram of the process implementing the concurrent server system of FIGS. 1.

In FIG. 2, a process 200 for concurrent client server affinity is entered in a step 201 in which the broker B arranges the service processes S1, S2, S3 in a queue in server memory 15 shown in FIG. 1.

In step 203, a client, e.g., C1, generates an identification key such as the client process ID, client host name, instance count or a concatenation of the foregoing, prior to the generation of a service request.

In step 205, the client submits the service request to the broker without indicating a preference for choosing a server process.

Figure 3:
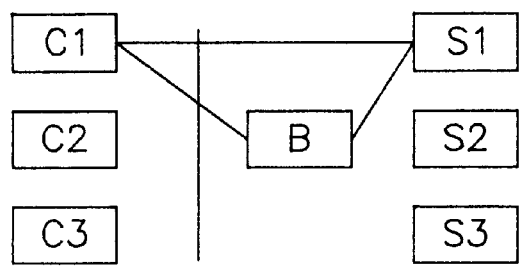
FIG. 3 is a representation of the broker connecting a client to a server in the system of FIG. 1 where the server preference is not requested.

In a step 207, the broker selects the first service process S1 in the queue as shown in FIG. 3 and in a step 209, the broker generates a server key (S1) which is passed to the client when connected to the server in a step 211. The client passes the unique client key (C1) to the server to identify itself upon connection.

Figure 4:
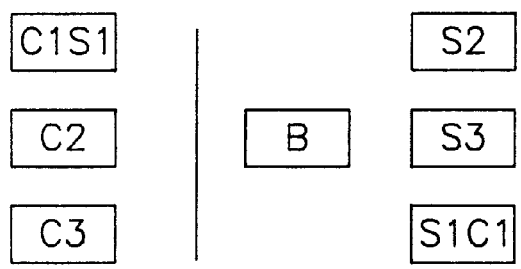
FIG. 4 is a representation of the concurrent server system of FIG. 1 after a service request has been completed.

When the client disconnects in step 213, the client retains the server key S1 and the server retains the client key C1. The server S1 returns to the end of the queue, as shown in FIG. 4, waiting to be used and knowing that it has served client C1 by retention of the C1 client key.

Figure 5:
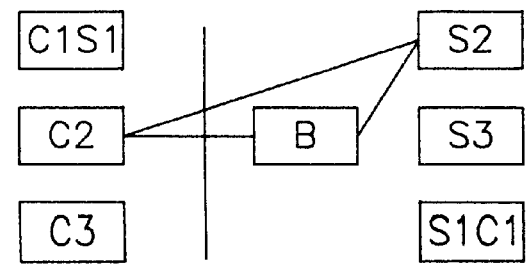
FIG. 5 is a representation of a second service request from a different client in the system of FIG. 1 where service preference has not been requested.

In step 215, the client S2 generates a service request and a unique key C2 which is passed to the broker without indicating any server preference. The broker selects the service process S2 at the top of the queue and generates a unique server key S2 in a step 217. The client C2 is connected to the service processor S2 in a step 219, as shown in FIG. 5, at which time the client provides the service processor S2 with its key C2.

Figure 6:
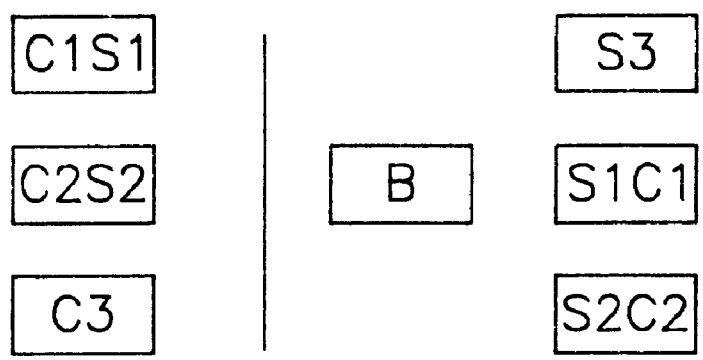
FIG. 6 is a representation of the concurrent server system of FIG. 1 after a second service request has been completed.

When C2 disconnects in step 221, C2 retains the server key S2 and server S2 retains the client key C2 in step 223. S2 returns to the bottom of the queue as shown in FIG. 6.

Figure 7:
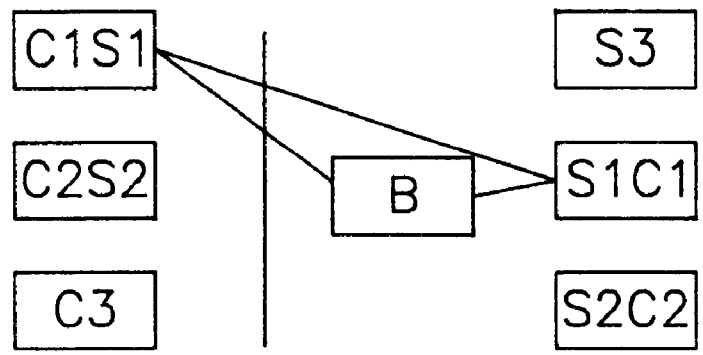
FIG. 7 is a representation of the concurrent server system of FIG. 1 in which the client requests preference for the server that previously served the client.

In step 225, C1 connects to the broker and this time C1 indicates a preference for the server S1 by sending the server key S1 to B. The broker B searches from the end of the available queue and finds S1 available which is now advanced in the queue as shown in FIG. 6. The broker forwards the connection request to S1 and the client sends its key C1 to S1 in step 227. The service processor S1 compares the received client key C1 with the copy of C1 retained and finds a match. In such case, the service processor does not need to reload and release the state data for C1 and connects to C1 as shown in FIG. 7 without reloading and refreshing C1's state data.

In the event the client has delayed too long to reconnect and its service process partner has made its way to the head of the queue where it was assigned by B to another client, the broker assigns the client to another processor at the top of the queue. Thus, the sooner a client reconnects to a server, the greater the chance that the client will find its server partner and server-affinity to a client is particularly well suited where the client connects and reconnects to the server on a per transaction basis.

Upon completion of the step 227, the process returns to step 201 or 221 depending upon whether the client is connecting or reconnecting to the service processor, respectively.

The process of FIG. 2 illustrates a "one-hop" client-server affinity. That is, the client is connected to one server. The process also supports a "multi-hop" server affinity where the clients themselves are server processes of other clients and affinity between the first tier clients and the server process is accomplished by the clients forwarding the broker-generated server keys S1, S2, S3 to the first tier clients for use with the servers after which, the first tier clients return the client keys to their respective clients. By using the client keys S1, S2, S3, the first tier clients are able to bypass the requirement for loading client specific applications before executing a process.

Summarizing, the present invention solves the problem and eliminates the overhead for a majority of service requests in a typical concurrent client sever system. In processing service requests of a client, a key is presented to the broker along with the request for a service processor. The broker preferentially allocates the service process that previously served the client. In so doing, the server process is released from refreshing its application data, thereby saving refresh time. Server affinity is particularly useful in internet-based client-server systems where such a key can be maintained as a variable in the client browser memory.

While the invention has been shown and described in connection with a preferred embodiment, various modifications may be made therein without departing from the spirit and scope of the invention as defined in the appended claims, in which:

We claim:

1. In a distributed information network, a system for improving network performance in response to service requests, comprising:

a) a broker server coupled to a plurality of child servers and to a plurality of clients in the network;
   b) a queue for prioritizing child server response to client service requests;
   c) means for connecting clients to a child server in the queue on a FIFO basis and providing the connected client with a unique server key identifying the connected child server for communication purposes;
   d) means for providing the connected child server with a copy of a unique client key at the time of initial service connection for communication purposes;

upon disconnect by the client, both the disconnected child server and the client retaining the unique key of the other; and f) means responsive to a subsequent client request including the retained unique server key for automatically re-connecting the client to the disconnected child server, wherever the disconnected child server may be in the queue.

2. The system of claim 1 wherein the unique child server key is different from the unique client key.

3. The system of claim 1 further comprising child server means for receiving a subsequent client service request including the unique client key and comparing the received unique client key to the unique client key retained in the connected child server whereupon if a match occurs between the received and retained unique client keys, the child server does not refresh and reload client state data which improves child server performance.

4. The system of claim 1 further comprising means for assigning the child server at the top of the queue to the next client initial service request.

5. The system of claim 1 further comprising means for preferentially routing successive client service requests to the child server previously responding to the client service request unless the child server has served another client in the interim between the successive client service requests.

6. The system of claim 1 further comprising means for clients to serve as servers for other clients and forward child server keys to the other clients for child server affinity with such other clients.

7. The system of claim 1 wherein the child servers are stateless servers.

8. The system of claim 1 where in the server key is stored in a browser memory.

9. In a distributed information network, a method for improving network performance in response to service requests, comprising the steps of:

a) coupling a broker server to a plurality of child servers and to a plurality of clients in the network;
   b) establishing in the broker server a queue for prioritizing child server response to client service requests;
   c) connecting clients to a child server in the queue on a FIFO basis and providing the connected client with a key identifying the child server;
   d) providing the child server with a copy of a client key at the time of the initial service request, the child server and the client retaining a copy of the other's key upon disconnect;
   e) returning the child server to the bottom of the queue after disconnect from the connected client; and
   f) automatically re-connecting the client to the disconnected child server upon a subsequent client service request.

10. The method of claim 9 further comprising the step of generating a child server key uniquely identifying the child server upon an initial service request the client.

11. The method of claim 9 further comprising the step of generating and storing a client key identifying the client for use in initiating service requests to the broker server.

12. The method of claim 9 further comprising the step of preferentially selecting a child server based on the server key provided by a client submitting a subsequent request for service to the broker server.

13. The method of claim 9 further comprising the step of selecting an alternate child server for the client in the event a requested child server is not available.

14. The method of claim 9 further comprising the step of selecting a child server at the top of the queue upon an initial service request by a client.

15. The method of claim 9 further comprising the step of forwarding the server key received by the client to another client for use with the child server where the client serves as an intermediary server in forwarding the server key to the another client.

16. The method of claim 9 further comprising the step of:
comparing a client key in a subsequent client request with a client key stored in the child server after disconnect from the child server to reconnect the client and child server upon a match of the client key and the stored client key.

17. The method of claim 16 further comprising the step of:
connecting the client to the child server wherever the child server may be in the queue upon the match of the client key and the stored client key.

18. The method of claim 17 further comprising the step of:
processing a subsequent client request upon the match of the client key retained in the child server and the client key in the subsequent request.

19. An article of manufacture:
a program medium executable in a computer system for improving performance in a network in response to service requests, comprising:
a) program instructions in the medium for coupling a broker server to a plurality of child servers and to a plurality of clients in the network;
b) program instructions in the medium for establishing in the broker server a queue for prioritizing child server response to client service requests;
c) Program instructions in the medium for connecting clients to a child server in the queue and providing the connected client with a key identifying the child server;
d) program instructions in the medium for providing the child server with a copy of a client key at the time of the initial service request, the child server and the client retaining a copy of the other's key upon disconnect;
e) program instructions in the medium for returning the child server to the queue after disconnect from the connected client; and
f) program instructions in the medium for automatically re-connecting the client to the disconnected child server upon a subsequent client service request.

20. The article of manufacture of claim 19 further comprising:
g) program instructions in the medium for comparing a client key in a subsequent client request with a client key stored in the child server after disconnect from the child server to reconnect the client and child server upon a match of the client key and the stored client key.

21. The article of manufacture of claim 20 further comprising:
program instructions in the medium for connecting the client to the child server wherever the child server may be in the queue upon the match of the client key and the stored client key.

22. The article of manufacture of claim 21 further comprising:
program instructions in the medium for using client data stored in the child server for processing the subsequent client request upon the match of the client key and the stored client key.

23. A concurrent server comprising
a) means coupling a plurality of child servers to a plurality of clients in a network;
b) means establishing a queue for prioritizing child server response to client service requests;
c) means responsive to a client request for connecting the client to a child server in the queue and providing the connected client with a key identifying the child server;
d) means providing the child server with a copy of a client key at the time of the initial service request, the child server and the client retaining a copy of the other's key upon disconnect;
e) means for returning the child server to the queue after disconnect from the connected client; and
f) means for automatically re-connecting the client to the disconnected child server upon a subsequent client service request.

24. The concurrent server of claim 23 further comprising:
g) means for comparing a client key in a subsequent client request with the client key stored in the child server after disconnect from the child server to reconnect the client and child server upon a match of the client key and the stored client key.

25. The concurrent server of claim 23 further comprising:
h) means for connecting the client to the child server wherever the child server may be in the queue upon the match of the client key and the stored client key.

26. The concurrent server of claim 23 further comprising:
i) means for using client data stored in the child server for processing the subsequent client request upon the match of the client key and the stored client key.

27. A concurrent server comprising:
a) means coupling a plurality of child servers to a plurality of clients in a netvork;
b) means establishing a queue for prioritizing child server response to client service requests;
c) means responsive to a client request for connecting the client to a child server in the queue and providing the connected client with a key identifying the child server;
d) means providing the child server with a copy of a client key at the time of the initial service request, the child server and the client retaining a copy of the other's key upon disconnect;
e) means for returning the child server to the queue after disconnect from the connected client;
f) means for comparing a client key in a subsequent client request with the client key stored in the child server after disconnect from the child server to reconnect the client and child server upon a match of the client key and the stored client key
g) means for connecting the client to the child server wherever the child server may be in the queue upon the match of the client key and the stored client key; and
h) means for using client data stored in the child server for processing the subsequent client request upon the match of the client key and the stored client key.

* * * * *